Feb. 7, 1956          E. L. MEARS ET AL          2,734,095
PLATE SEPARATOR FOR STORAGE BATTERIES
Filed Sept. 20, 1952
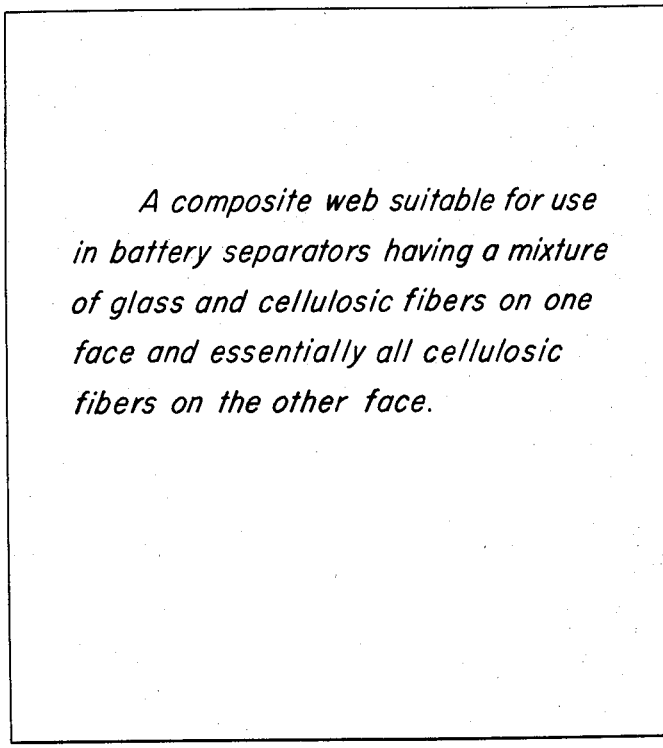
A composite web suitable for use in battery separators having a mixture of glass and cellulosic fibers on one face and essentially all cellulosic fibers on the other face.
Fig. 1
Fig. 3
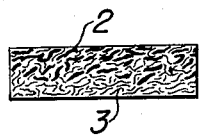
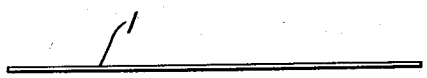
Fig. 2

United States Patent Office 2,734,095
Patented Feb. 7, 1956

2,734,095

PLATE SEPARATOR FOR STORAGE BATTERIES

Edward L. Mears, Lexington, and Charles B. Moore, Scituate, Mass., assignors to W. R. Grace & Co., Cambridge, Mass., a corporation of Connecticut Application September 20, 1952, Serial No. 310,728

1 Claim. (Cl. 136—145)

In numerous patents and publications it has been proposed to make battery separators by producing a lofty, cellulosic web, then impregnating the web with a solution of a thermosetting resin which has acid resistant properties. Ribs are formed in the web, usually by upthrusting portions of the web above the plane of the sheet, and the resin is cured by heat until it has reached its thermoset stage. Appropriate separator lengths are then cut from the web. The prior art also discloses a considerable number of paper-making furnishes, proper resins, adequate rib forming techniques and the porosities of the paper which have been found to be necessary. Satisfactory storage battery separators may be made by following this art.

More recently, however, it has been found that the performance of these separators can be improved by adding glass fibers to the cellulosic furnish from which the web is formed. The presence of glass fiber not only produces a web which has considerable strength, but its stiff, springy nature causes a lofty sheet to be formed which, even though it is later bonded together by cured resin, is nonetheless so porous that it offers but slight resistance to the passage of the electrolyte.

Experience has shown that the cellulosic fibers when properly impregnated with acid resistant resins satisfactorily withstand the action of the battery acid even at 140° F. There is, however, an oxidative action which takes place if the material of the separator is in direct contact with the positive plate. Since glass fibers are completely resistant to this oxidative action, separator webs which contain glass in those areas which come in actual contact with the positive plate hang together well and give long and satisfactory service in a storage battery.

The manufacture of low-density glass fiber containing webs has however proved difficult and expensive for the following reasons:

First, far too large a proportion of unuseable material is produced; and, second, as glass frequently assumes such a condition in the paper web that it interferes with the subsequent steps in the manufacture of a battery separator.

Specifically, these difficulties occur because commercial short glass fibers contain a small proportion of malformed shapes such as specks, bullets or nodules of glass. The actual proportion of this scrap glass in commercial material is not large, nevertheless, it is sufficient to cause an alarming number of pinholes in the sheet.

It is obvious that the presence of a pinhole in a battery separator ruins it. For the lead salts can then "tree" through the pinhole and short the plates.

Glass in fiber form as prepared for textile uses is substantially free from nibs or nodules, but if it is cut to paper making length, say in a hammer mill, some of the fibers stick together forming dense "buttons" of compacted glass. Commercially this product is known as "milled glass." The paper beater does not break up buttons in milled glass or liberate their fibers to any useful degree. If a milled glass cellulosic slurry is run out on a paper making wire, some of the buttons exfoliate as the sheet dries. On the surface they cause "pop outs." Deep in the web, they cause "blisters." Both defects tend to form pinholes in the finished sheet.

In manufacturing battery separators, perhaps an even more costly result is that buttons or dense, small nibs or pellets of glass interfere with the proper formation of ribs in the separator after the web has been impregnated with acid resistant resin. If the roll is heated (and a preferred method or rib formation utilizes a heated roll) the popouts stick to the roll, build up on it and soon jam between the interfitting ribbing rolls. Besides wasting a large amount of semiprocessed material, this defect is also responsible for much costly "down time" on the ribbing machine.

The objects of the present invention are to minimize process losses, particularly by preventing pinholes and buttons from forming and to prevent process loss and down time in the manufacturing operation.

Experience has shown that a range of glass fibers to cellulose fibers extending from 10 to 50% glass and correspondingly from 90% to 50% cellulose fibers will felt on a paper making wire. Also, to take full advantage of the springiness of the glass fibers as an aid in producing the lofty, low density, porous webs necessary for battery separator use, the glass fibers should be reduced approximately to paper making length, yet these fibers create the troubles we have discussed.

We have discovered that if long glass fibers as prepared for textile uses either of fiber or of staple length are subjected to impact while they are surrounded by a liquid, they will be broken to approximately paper making lengths, yet very few buttons of glass will be formed. Breaking the glass fiber into paper making lengths may be accomplished in a paper beater or a pulper as a separate operation, but it is accomplished equally well with a saving in time when the full charge of cellulosic pulp and the long glass fibers are beaten together. We have found, however, that it is preferable to form the slurry of glass and cellulosic pulp in a pulper such as a "Dynopulper" which is a cylinder provided with oppositely rotating, rough, concave wheels adjacent each end of the cylinder. The reason is that even if long, clean glass fibers are added to a paper beater, occasionally a rope of glass fiber will be pounded between the beater roll and the bed plate. A button of glass will form from this impact. In a "Dynopulper," the fiber may be hit by the rough wheel, but it is still suspended in water and cannot be hit in a manner which can compact the fibers.

The glass-cellulose slurry which is formed by beating long glass fibers in a beater or in the pulper will, when run out onto a paper making wire, be found to contain very few pop outs. When a pulper is used, not more than one or two pop outs will be found in each square yard of material. Nevertheless, even one or two pinholes to the square yard will cause serious trouble, and it is necessary to prevent any pop out from causing a pinhole in the sheet.

In work leading to this invention, we discovered that if a web containing glass nibs or buttons is laid upon a web containing essentially only cellulose pulp, then when the combined web is squeezed, as happens under the couch roll in a paper making operation, the nibs or buttons merely bed themselves in the cellulosic web and do not punch small holes through the sheet. In the rib forming operation, the roll crushes the pop out into the cellulosic under layers where it beds in and tangles with the cellulosic fibers. It says there and is not picked up on the ribbing roll. Consequently, the improved webs which are the subject of this invention are composite structures composed of two separate paper making furnishes:

One, a glass-cellulosic furnish preferably formed in a pulper in the manner which has been described, and two, a cellulosic furnish consisting essentially of cellulose fibers.

If this web is to be formed on a two-stage Fourdrinier machine, the cellulosic portion of the web is run out on the wire from the first headbox, and after the slurry has drained sufficiently for the web to take form, the glass-cellulosic slurry is run out upon the first cellulosic web. The composite web is then advanced through the machine in a normal paper making manner using very light pressure under the couch roll or sometimes removing the couch roll entirely.

The web may also be made in a duplex cylinder machine, and in this case the cellulosic web is formed on the first cylinder, and the glass containing web formed on the second cylinder is laid upon the cellulosic web.

In the drawing,

Figure 1 is a front view of a section of a composite web involving the invention.

Figure 2 is a cross section view of the same composite web.

Figure 3 is an enlargement of the cross section of Figure 2.

In Figures 1 and 2 the composite web is indicated at 1, and in Figure 3 the glass fibers are indicated at 2, and the cellulosic fibers at 3.

The particular furnishes, resin impregnating technique, rib forming practice, and the resin curing methods are not in themselves part of the present invention. It will be recognized that the user of our improved web will have a wide choice of compositions and manufacturing techniques. However, to make the disclosure complete, one procedure will be given by way of example. As a specific example: 75 parts of a strong, unbleached kraft pulp and 25 parts of fine glass textile fibers having a diameter between 0.00013 and 0.00030 inch and preferably above 0.00015 inch are added to water either in a paper pulper or beater and worked until the glass fiber length has been reduced to paper making length. About 5 parts of a wet strength resin are added, and the stock is transferred to the tank of a duplex cylinder machine.

100 parts of a strong, unbleached kraft pulp is beaten with a light roll setting until a sample of a slurry shows a freeness of about 8 seconds as measured by a Williams freeness tester. About 5% based on the dry weight of the pulp of a wet strength resin such as ureaformaldehyde resin (Parez No. 609) is added to the slurry at the end of the beating period. From the beater, the stock is transferred to the tank of the first cylinder of a duplex cylinder machine.

Assuming that battery separators suitable for automotive starting batteries are to be made and that these require separators of about .030 in thickness, the flow and draining rate of the cellulosic pulp is adjusted so that a web having a dry thickness of about .020 is built up on the cylinder. Likewise, the glass-containing slurry is formed into a web having a dry thickness of about .010 on the second cylinder of the machine. The glass containing web is laid upon the cellulosic web, and the composite web which is formed by the superpositioning of these webs in the wet state passes on through the normal paper making finishing procedure. Should any nib or button exist in the glass containing web, it is merely bedded into the cellulosic portion of the web by the action of the rolls. Pinholes are not formed.

It will be understood that the glass containing portion of our composite web may have any thickness which is not substantially more than ½ of the total thickness of the web. We believe that approximately ½ of the total thickness of the web should be formed from cellulose fibers so that a glass nib can press into the fibers and be successfully held by them.

After the composite web is dried and is slit into convenient widths, it is passed through a solution of an acid resistant thermosetting resin. Many suitable resins are available. The essential characteristics are that the resin shall coat the fibers well, react to a relatively inert, infusible stage in the presence of heat, and when so reacted shall resist battery acid. Examples are the furfuraldehyde resins, the urea aldehyde resins and those of the phenolic group.

The resin solution saturated web is then run through a calender which preferably is adjusted to exert a limited thrust per linear inch so that the desired proportion of resin, from 10 to 35% of dry resin to the dry weight of the web, remains after the web is dried. After the excess resin has been removed by this calendering operation, the web is dried, preferably in air heated to a temperature not exceeding that at which the resin would begin to cure. Subsequently, the dried web is run between heated, contoured rolls which form ribs in the web and which initiate the cure of the resin in the ribbed portions of the web as the web passes through the rolls. The glass face of the composite web is placed against the matrix rolls so that the outer surface of the upthrust ribs so formed will have a glass containing surface since in the assembly of storage batteries that surface of the separator which has upthrust ribs is placed against the positive battery plate. Curing the resin in the rib as the rib is formed serves to prevent any change in the overall dimensions of the separator during subsequent curing operations. However, we have found it preferable to heat only the ribbed areas of the separator during the rib forming operations since a more uniform low resistance will be secured in the current carrying areas of the battery separator (those areas between the ribs) if those areas are cured in the entire absence of pressure.

The web is then cured in an oven for a time and at a temperature sufficient to insure the complete reaction of the resin in the web to the C or infusible stage. Since the resin coated paper is highly hydrophobic, it is necessary to wet out the cured web so that it will be permeable to battery acids. To do this the web is then run through a bath of a wetting agent such as a 2% aqueous solution of Turkey red oil. The web is then dried and cut into battery lengths.

Our method of breaking long glass fibers into paper making length while the fibers are suspended in liquid nearly eliminates the occurence of nibs or buttons of glass which have caused costly losses in the past. The nearly uniform glass-cellulosic wet web bonds securely to the underlying wet web of cellulose so that the dried composite web is a completely unified sheet. The very few remaining glass nibs or buttons are forced into the cellulose fibers and do not form pinholes, jams in the ribbing operation are avoided and because glass fibers reinforce the rib wherever it touches the positive plate, the separator holds together throughout a long life.

In this specification, when we refer to fibers as being of paper making length, we mean fibers which are neither so long that proper formation is not achieved on the paper making wire nor so short that there is excessive fiber loss through the wire. Under normal conditions, we have found that slurries containing fibers having a predominant length between one-quarter and one-thirty-second of an inch to be satisfactory. Williams freeness measurements have been made by measuring the time required for a liter of slurry containing 1½ grams dry weight of fiber to drain from a Williams freeness tester.

We claim:

A substantially pinhole free, composite web suitable for use in battery separators having one face composed of from 10 to 50% glass fibers and correspondingly 90 to 50% of cellulosic fibers, the glass fibers having diameters lying between 0.00013 and 0.00030 inch and being of paper making length, the rear face of said composite web being composed essentially of cellulosic fibers; said cellulosic fibers forming at least one-half the thickness of the web, the glass fiber containing face of the web being substantially free of nibs and compacted glass particles.

References Cited in the file of this patent

UNITED STATES PATENTS

| | | |
|---|---|---|
| 168,186 | Russell | Sept. 28, 1875 |
| 1,500,207 | Shaw | July 8, 1924 |
| 1,532,083 | Shaw | Mar. 31, 1925 |
| 1,722,432 | Kirschbraun | July 30, 1929 |
| 1,964,793 | Richter | July 3, 1934 |
| 1,995,145 | Frost | Mar. 19, 1935 |
| 2,108,116 | Furminger | Feb. 15, 1938 |
| 2,287,305 | Haverbeck | June 23, 1942 |
| 2,414,833 | Osborne | Jan. 28, 1947 |
| 2,422,345 | Easterberg et al. | June 17, 1947 |
| 2,484,047 | Perry | Oct. 11, 1949 |
| 2,504,744 | Sproull et al. | Apr. 18, 1950 |
| 2,626,213 | Novak | Jan. 20, 1953 |
| 2,626,429 | Merrill | Jan. 27, 1953 |

FOREIGN PATENTS

| | | |
|---|---|---|
| 113,887 | Australia | June 24, 1940 |
| 370,212 | Great Britain | Apr. 7, 1932 |

OTHER REFERENCES

Callinan et al.: The Electrical Properties of Glass Tube Paper, pp. 5–7, published by Naval Research Lab., May 1951.